(12) United States Patent
Segev et al.

(10) Patent No.: US 10,757,560 B2
(45) Date of Patent: *Aug. 25, 2020

(54) DYNAMICALLY ASSOCIATED NEIGHBOR AWARENESS NETWORKING (NAN) DISCOVERY WINDOWS FOR FINE TIMING MEASUREMENT

(71) Applicant: INTEL CORPORATION, Santa Clara, CA (US)

(72) Inventors: Jonathan Segev, Tel Mond (IL); Emily Qi, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/229,321

(22) Filed: Dec. 21, 2018

(65) Prior Publication Data

US 2019/0387389 A1 Dec. 19, 2019

Related U.S. Application Data

(63) Continuation of application No. 15/652,964, filed on Jul. 18, 2017, now Pat. No. 10,187,779, which is a continuation of application No. 14/546,045, filed on Nov. 18, 2014, now Pat. No. 9,763,073.

(60) Provisional application No. 62/010,667, filed on Jun. 11, 2014.

(51) Int. Cl.
*H04W 8/00* (2009.01)
*H04W 84/18* (2009.01)

(52) U.S. Cl.
CPC .......... *H04W 8/005* (2013.01); *H04W 84/18* (2013.01)

(58) Field of Classification Search
CPC ............................ H04W 84/18; H04W 8/005
See application file for complete search history.

(56) References Cited

U.S. PATENT DOCUMENTS

| | | |
|---|---|---|
| 9,143,979 B1 | 9/2015 | Lambert |
| 9,237,546 B1 | 1/2016 | Zhang et al. |
| 2015/0341750 A1 | 11/2015 | Hayes et al. |
| 2015/0350027 A1 | 12/2015 | Raissinias et al. |
| 2015/0350866 A1 | 12/2015 | Patil et al. |

OTHER PUBLICATIONS

IEEE P802.11, Wireless LANs CID 2164 and CID 2407, IEEE Publication, Jan. 2014 (21 pages).

*Primary Examiner* — Habte Mered
(74) *Attorney, Agent, or Firm* — Eversheds Sutherland (US) LLP (57) ABSTRACT

Certain embodiments herein relate to a dynamic pre-association between Neighbor Awareness Networking (NAN) discovery windows and fine timing measurement (FTM) communications. A wireless station may trigger an FTM procedure during a NAN discovery window by the transmission of a NAN Service Discovery Frame (SDF). In addition to the FTM communications, an indication of a discovery window for which a subsequent FTM communication is expected to occur is also transmitted. In some embodiments, an FTM range report may also be transmitted with the indication.

20 Claims, 9 Drawing Sheets

DYNAMICALLY ASSOCIATED NEIGHBOR AWARENESS NETWORKING (NAN) DISCOVERY WINDOWS FOR FINE TIMING MEASUREMENT

PRIORITY CLAIM

This application claims priority to U.S. patent application Ser. No. 14/546,045, filed on Nov. 18, 2014, entitled "Dynamically Associated Neighbor Awareness Networking (NAN) Discovery Windows for Fine Timing" which claims priority to U.S. Provisional Patent Application No. 62/010,667, filed on Jun. 11, 2014, entitled "Adaptive Discovery Window for Fine Timing Measurement" the disclosures of which are hereby incorporated by reference in their entirety.

BACKGROUND

Wireless devices (also referred to as "wireless stations") are increasingly dependent upon their proximity to other wireless devices as context for various applications. In some approaches, an initiating wireless station (e.g., a smartphone or other mobile wireless device) can determine its relative location by communicating with responding wireless stations (e.g., a printer or other stationary wireless device). Such approaches can involve analyzing communications between the initiating wireless station and the responding wireless station to help determine the initiating wireless station's proximity (e.g., range measurement) to the responding wireless stations. In some instances, the proximity determinations may not be responsive enough to provide adequate performance for the various applications that rely on the determinations between stations. For example, a user may perceive that a wireless device or program executing thereon is slow to respond, inaccurate, or unusable if the wireless device is unable to receive timely proximity determinations based on the communication between stations.

BRIEF DESCRIPTION OF THE FIGURES

The detailed description is set forth with reference to the accompanying figures. In the figures, the left-most digit(s) of a reference number identifies the figure in which the reference number first appears. The use of the same reference numbers in different figures indicates similar or identical items.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

DETAILED DESCRIPTION

Embodiments herein relate to, among other things, dynamic pre-association between Neighbor Awareness Networking (NAN) discovery windows and Fine-Timing-Measurements (FTM) communications in a NAN cluster. In some embodiments, a wireless station may trigger an FTM procedure by transmitting a NAN Service Discovery Frame (SDF) during a NAN discovery window. In some embodiments, the NAN discovery communications and FTM communications may occur on different channels. In addition to the FTM communication, the wireless station may send an indication of an expected discovery window for a subsequent FTM communication. A receiving wireless station may then receive the indication of the discovery window and send or receive a subsequent FTM communication in the indicated discovery window. In this manner, a wireless station may dynamically configure the rate of FTM range measurements triggered within periodic NAN discovery windows. In some embodiments, after an FTM range measurement is determined, an initiating wireless station may also send an FTM range report with the indication of a discovery window.

Figure 1:
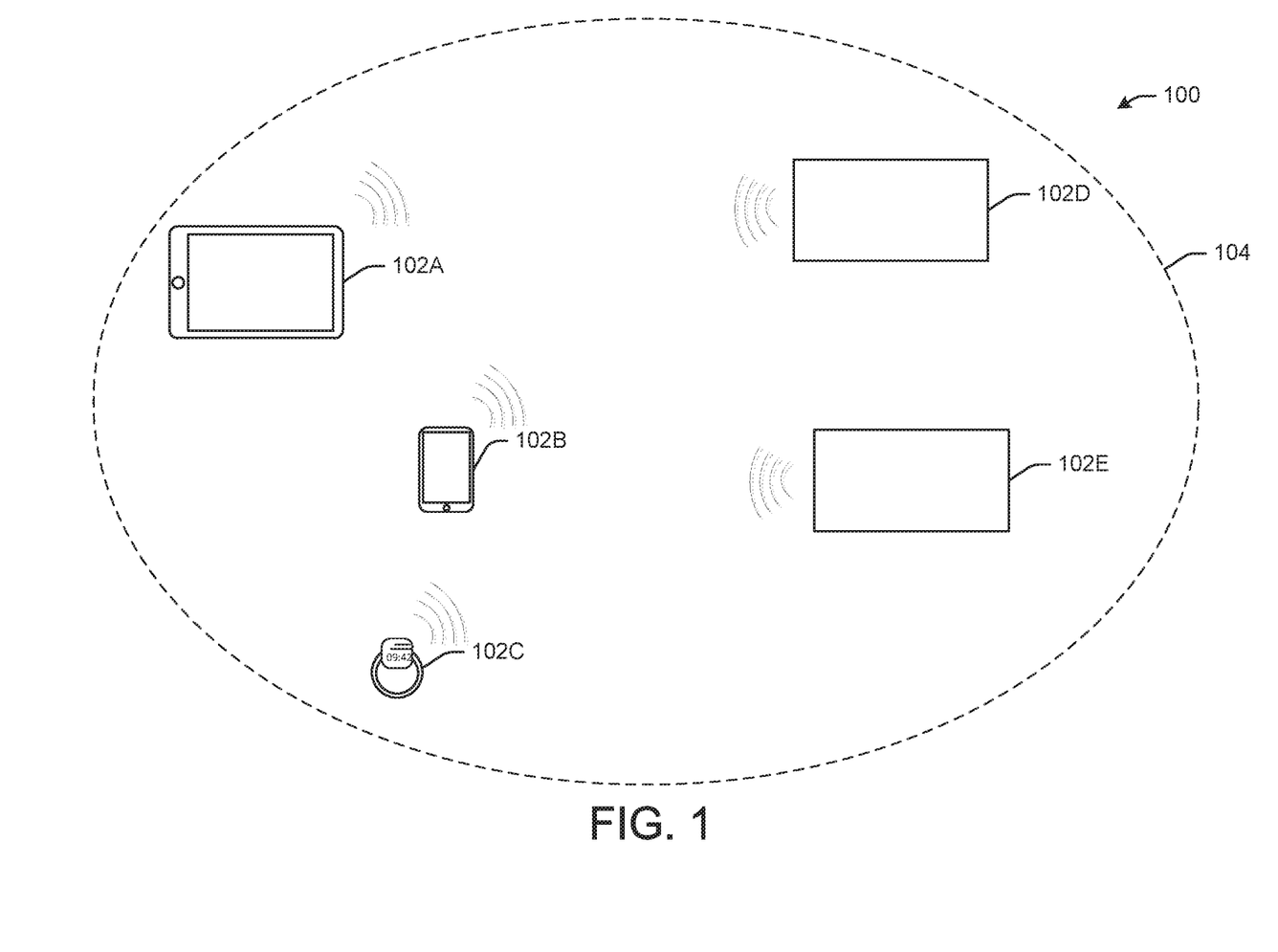
FIG. 1 a schematic diagram depicting an embodiment of a Neighbor Awareness Networking (NAN) cluster.

FIG. 1 depicts an example Neighbor Awareness Networking (NAN) environment 100 in which the dynamic pre-association between NAN discovery windows and FTM communications described herein may be implemented. The NAN environment 100 may include wireless stations 102 that may wirelessly communicate over a wireless network using a wireless communication protocol. In some embodiments, the wireless stations may include mobile wireless stations, such as a tablet computer 102A, a smartphone 102B, and a wearable computer 102C (e.g., a smartwatch, an optical head-mounted display, and the like). In some embodiments, the wireless stations 102 may include relatively stationary wireless stations 102D and 102E. For example, stationary wireless stations 102D and 102E may include devices such as printers, appliances (e.g., refrigerators, microwaves, stoves, etc.), audio and video devices (e.g., televisions, monitors, video cameras, stereo receivers, set top boxes, thermostats etc.), residential controls (e.g., garage door openers, light switches, door locks etc.), and other suitable devices.

The example environment 100 can include an indoor facility, such as an airport terminal, office, a residence, a shopping mall, a university building, or other interior space that may include walls (not shown) and other items located within the interior space and the one or more wireless stations may be within the indoor facility. In additional or alternative embodiments, the example environment 100 can include one or more buildings and the one or more wireless stations 102 may be inside or outside of the buildings in any desirable configuration.

In some embodiments, the wireless stations may belong to a NAN cluster 104. The wireless stations 102 may be configured to communicate over a wireless network according to one or more wireless communication protocols. In this context, a protocol refers to parameters used to communicate, such as a channel on which communications occur, timing of communications (e.g., timing of discovery intervals), etc. In another example, the wireless stations 102 of the environment 100 may also communicate data, such as data associated with a particular application that is common to each wireless station 102. It should be appreciated that, in the contexts described further below describing communication between two wireless stations, any one of the wireless stations 102 may be an initiating wireless station and any other of the wireless stations 102 may be a responding wireless station. For example, the tablet computer 102A may be an initiating wireless station and the stationary wireless station 102D may be a responding wireless station. Similarly, in another example, the stationary wireless station 102E may be an initiating wireless station and the wearable computer 102C may be a responding wireless station.

In the environment depicted in FIG. 1, a wireless station 102 may send various NAN discovery communications during a time interval (referred to as a "discovery window") associated with advertisement of the wireless stations 102. The discovery communications indicate a post-discovery communication technique or protocol for communicating within the environment 100 during or after the discovery window.

In some embodiments, a Post NAN discovery communication technique may include techniques for determining the distance between an initiating wireless station and a responding wireless station. For example, an initiating wireless station can communicate with a responding wireless station to determine a respective distance from the responding wireless station. In some embodiments, the initiating wireless stations can measure their respective distances from initiating wireless stations based at least in part on the time-of-flight of one or more timing messages transmitted to the initiating wireless stations by the responding wireless stations and/or one or more messages transmitted by the initiating wireless station to the responding wireless station. A timing message transmitted from a responding wireless station to an initiating wireless station can include an instruction to the initiating wireless station to record the time the initiating wireless station receives the timing message and a time that a previous message, transmitted by the initiating wireless station, was received by the responding wireless station. A timing message transmitted from a responding wireless station to an initiating wireless station can include an instruction to the initiating wireless station to record the time the initiating wireless station receives the timing message; a time that a previous message, transmitted by the responding wireless station, was received at the initiating wireless station. For clarity, a timing message comprising an acknowledgement is referred to as an acknowledgement message. As described below, an initiating wireless station can determine the time-of-flight of timing messages based at least in part on the contents of the timing messages.

As used herein, the time-of-flight of a timing message refers to the approximate difference between the time a timing message is sent by a responding wireless or an initiating wireless station and the time the timing message is received by the respective initiating wireless station and the responding wireless station 102. In some embodiments, an initiating wireless station can determine its distance from a responding wireless station 102 using FTM techniques (also referred to as a "Fine Timing Measurement procedure"). In some such embodiments, as explained below, one or more timing messages are exchanged between the initiating wireless station and the responding wireless station and an initiating wireless station can determine the time-of-flight of at least one of the timing messages, as described below. Based at least in part on the time-of-flight of the one or more timing messages, the initiating wireless station can determine its distance from the responding wireless station. The initiating wireless stations can transmit and receive messages from the responding wireless stations using a WiFi signal, a WiFi Direct signal, or via various other wireless communications protocols. In some embodiments, the NAN protocol may be operative to perform service discovery, where a following FTM procedure can be used to determine distance between wireless stations, for example.

Figure 2:
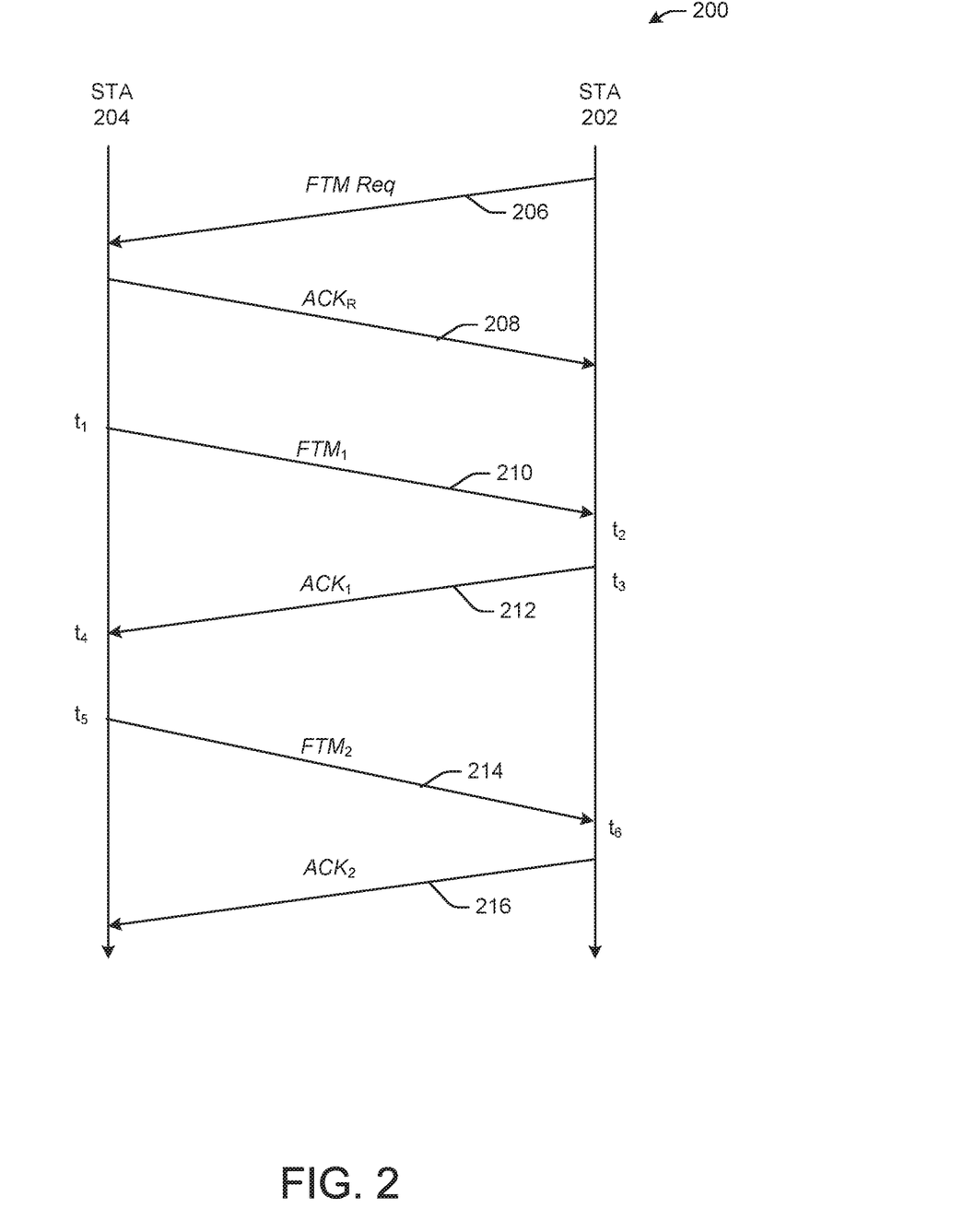
FIG. 2 is a schematic diagram depicting an embodiment for a fine timing measurement (FTM) determination of the distance between an initiating wireless station and a responding wireless station.

FIG. 2 is a simplified schematic 200 of an example embodiment for determining the distance between an initiating wireless station 202 and a responding wireless station 204. In FIG. 2, "t" denotes time. Initially, the initiating wireless station 202 sends an FTM Request ("FTM Req") 206 to the responding wireless station and, in response, the responding wireless station 204 sends an acknowledgement of the request ("ACK$_R$") 208 to the initiating wireless station 202. At time $t_1$, the responding wireless station 204 sends a timing message, FTM$_1$, to the initiating wireless station 202 and the responding wireless station 202 stores the time FTM$_1$ was sent ($t_1$). At time $t_2$, the initiating wireless station 202 receives FTM$_1$ and records the time it was received ($t_2$). At time $t_3$, the initiating wireless station 202 transmits an acknowledgement message 212 (ACK$_1$) to the responding wireless station 204 and records the time it sent ACK$_1$ ($t_3$).

In some embodiments, ACK$_1$ can include an indication to the responding wireless station 204 that FTM$_1$ was received by the initiating wireless station 202. At time $t_4$, the responding wireless station 204 receives ACK$_1$ and, responsive to receiving ACK$_1$, records the time it was received ($t_4$). At time $t_5$, the responding wireless station 204 transmits a timing message 214 (FTM$_2$), including the recorded times $t_1$ and $t_4$ to the initiating wireless station 202, which is received at time $t_6$. After receiving FTM$_2$, the wireless station 202 may send an acknowledgment 216 (ACK$_2$). The initiating wireless station 202 can then determine the distance to the responding wireless station 204 using the times $t_1$-$t_4$, wherein the first-of-flight of FTM$_1$ can be taken as $t_2$-$t_1$ and the time-of-flight of ACK$_1$ can be taken as $t_3$-$t_4$. In one example embodiment, the distance R between the responding wireless station 202 and 204, can be given by Equation 1:

$$R = c\frac{(t_4 - t_1) - (t_3 - t_2)}{2} \quad (1)$$

where c is the speed of light (about $3\times10^8$ m/s). The distance determination may be referred to herein as an "FTM range measurement." While, for clarity, FTM and ACK are used herein to refer to transmissions by the responding wireless stations 202 and transmissions by the initiating wireless stations 204, respectively, a person of ordinary skill in the art will understand that both transmissions can be timing messages and the content of the transmissions FTM and ACK can be the same, similar or different.

As mentioned above, the FTM communication is a single burst during the NAN discovery window described above. The NAN discovery window sets the meeting time for two wireless stations such that the FTM procedure is triggered within the NAN discovery window. Thus, the rate of determined range measurement rates may be limited by the ability to trigger an FTM procedure during the NAN discovery windows specified by a version of the NAN protocol. A version of the NAN protocol may define a fixed periodical relationship between the NAN discovery windows and triggered FTM procedures, such that FTM range determinations may only be triggered based on a fixed rate of specific NAN discovery windows. In such instances, the rate and accuracy of FTM range determinations (resulting from FTM range procedures triggered within NAN discovery windows) may affect the performance of applications executing on a wireless station. For example, an application may expect a relatively high rate of range determinations to meet a specific level of responsiveness and performance. Additionally, a mobile wireless station moving at or greater than a minimum speed toward another wireless station may desire a higher rate of range determinations for improve range accuracy.

Embodiments of the techniques described herein include a dynamic pre-association between FTM procedures and NAN discovery windows. In some embodiments, the dynamic pre-association techniques described herein may be implemented in a version of the NAN protocol. As described further below, a discovery window indication may be sent during the FTM procedure to indicate an expected discovery window for a subsequent FTM procedure. Another wireless station may respond in the indicated discovery window to enable the wireless stations to obtain FTM range measurements at a desired time and, in some embodiments, at a desired rate. Consequently, the wireless stations may coordinate pre-association to provide improved responsiveness for the on-going FTM range measurements. Additionally, as described further below, the dynamic pre-association between the FTM procedure and the NAN discovery windows may be configured to optimize the responsiveness (e.g., the range measurement rate) vs. power consumption.

Figure 3:
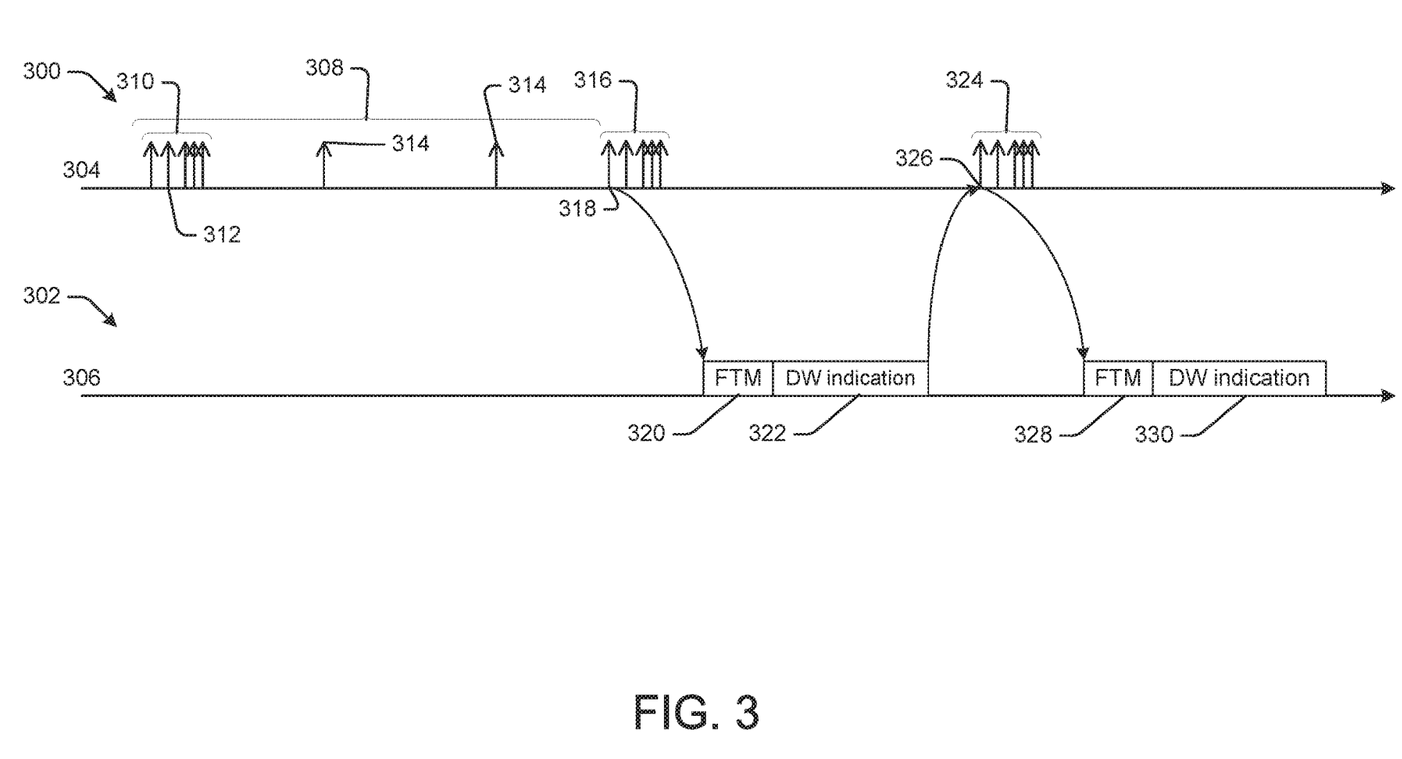
FIG. 3 is a schematic diagram depicting a dynamic pre-association between NAN discovery windows and FTM communications according to an example embodiment of the present disclosure.

FIG. 3 is a schematic diagram illustrating dynamic pre-association between NAN discovery communications 300 and FTM communications 302 in accordance with the techniques described herein. As shown in FIG. 3, in some embodiments, the NAN discovery communications may be transmitted on a first channel 304 and the FTM communications may be transmitted on a second channel 306. In other embodiments, the NAN discovery communications and FTM communications may be transmitted on the same channel.

As shown in FIG. 3, a NAN discovery interval 308 is depicted that includes the start of a first NAN discovery window 310 and corresponds to the time interval between NAN discovery windows. In the first NAN discovery window 310, NAN synchronization beacons 312 may be transmitted to assist wireless stations within a NAN cluster synchronize their clocks. In some embodiments, a wireless station in a NAN cluster may transmit at least one synchronization beacon during a discovery window such as the first discovery window 310. During the NAN discovery interval 308, discovery beacons 314 may also be transmitted by wireless stations within a NAN cluster. The discovery beacons 314 may assist other NAN-capable wireless stations discover the NAN cluster.

FIG. 3 also depicts a second NAN discovery window 316 that occurs after elapse of the discovery interval 308. Following the initial NAN discovery, a wireless station may transmit a NAN Service Discovery Frame (SDF) 318 during the NAN discovery window 314 to trigger an FTM procedure with another wireless station. The NAN SDF 318 may include information regarding the FTM procedure such as, for example, a channel for the FTM communications, and a time and/or duration of window for the communications. In some embodiments, if a wireless station wants to limit the set of target stations for FTM, it can publish a set of target NAN stations for FTM.

As shown in FIG. 3 and as mentioned above, the FTM procedure may be performed on a second channel 306. An FTM communication 320 (e.g., a timing message), in accordance with the procedure described above and illustrated in FIG. 2, may be sent after the FTM procedure is triggered from within the discovery window 306. In addition, an indication 322 of the discovery window for the next expected FTM communication is sent. The discovery window indication 322 may include any suitable indication that enables a wireless station to determine the occurrence of a discovery window. In some embodiments, the discovery window indication 322 may include a time interval, a specific time, pointer to a SDF, or any suitable indication or combination thereof.

The indication 318 indicates to other wireless stations the next discovery window a subsequent FTM communication is expected. For example, an initiating wireless station may desire a relatively high rate of range measurements to ensure adequate responsiveness of an application. In such instances, after an FTM procedure, the initiating wireless station may send an indication of the discovery window for which it desires a subsequent FTM procedure. In some embodiments, the receiving wireless station may respond according to this expectation. Additionally, or alternatively, the receiving wireless station may also send its own discovery window indication for which it expects a subsequent FTM procedure. In this manner, each station may negotiate for a desired discovery window for the next expected FTM communications As shown in FIG. 3, the indicator 322 may indicate a discovery window 324 that occurs immediately after the previous discovery window 316. The discovery windows 316 and 324 may be separated by a second discovery window interval (not shown). During this next discovery window 324, a wireless station may transmit a NAN SDF 326 to trigger a subsequent FTM procedure, thus enabling the wireless station to obtain another FTM range measurement without waiting for a later discovery window. Thus, as shown in FIG. 3, another FTM communication 328 (e.g., a timing message) and another discovery window indication 330 may be transmitted on the second channel 306 after triggering of another FTM procedure. In this manner, another FTM procedure may be performed and another discovery window may be negotiated for the next FTM communication.

Figure 4:
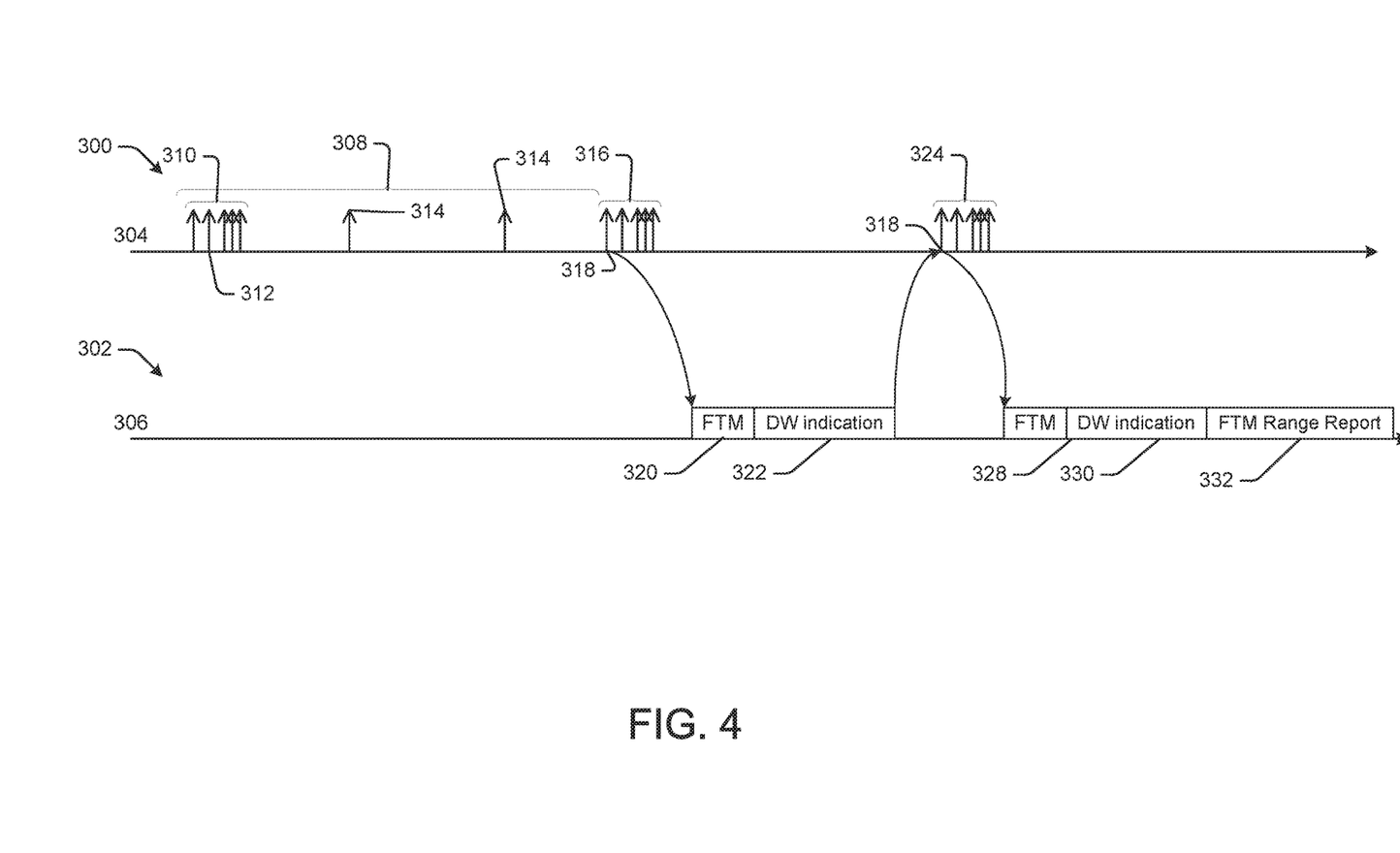
FIG. 4 further depicts the schematic diagram of FIG. 3 illustrating a transmission of an FTM range report according to an example embodiment of the present disclosure.

In some embodiments, the range measurement report determined from an FTM procedure may also be provided with the discovery window indication. FIG. 4 depicts the simplified schematic of FIG. 3 and illustrates the addition of the FTM range measurement report to the discovery window indication.

As shown in FIG. 4 and as described above, after the second discovery window 316, the FTM communication 328 and an indication 330 of a discovery window is sent. In addition, an FTM range report 332 may be sent with the indication 330. The FTM range report may include an FTM range determination based on the previous FTM communications. A responding wireless station that desires an FTM range determination can obtain the range determination from the FTM range report transmitted with the discovery window indication 330. Advantageously, the responding wireless station does not need to initiate an FTM procedure to obtain a FTM range measurement and avoid an additional delay (e.g., another discovery window cycle) to obtain an FTM range measurement.

In some embodiments, the pre-association between the FTM procedure and the NAN discovery windows may be dynamically configured to meet desired power consumption and responsiveness. For example, a wireless station greater than a distance threshold away from another wireless station may choose a less responsive range measurement (e.g., a lower rate of FTM procedures) to decrease power consumption. After the wireless station is within a distance threshold, the wireless station may desire a more responsive range measurement (e.g., a higher rate of FTM procedures) at the cost of increased power consumption.

Figure 5:
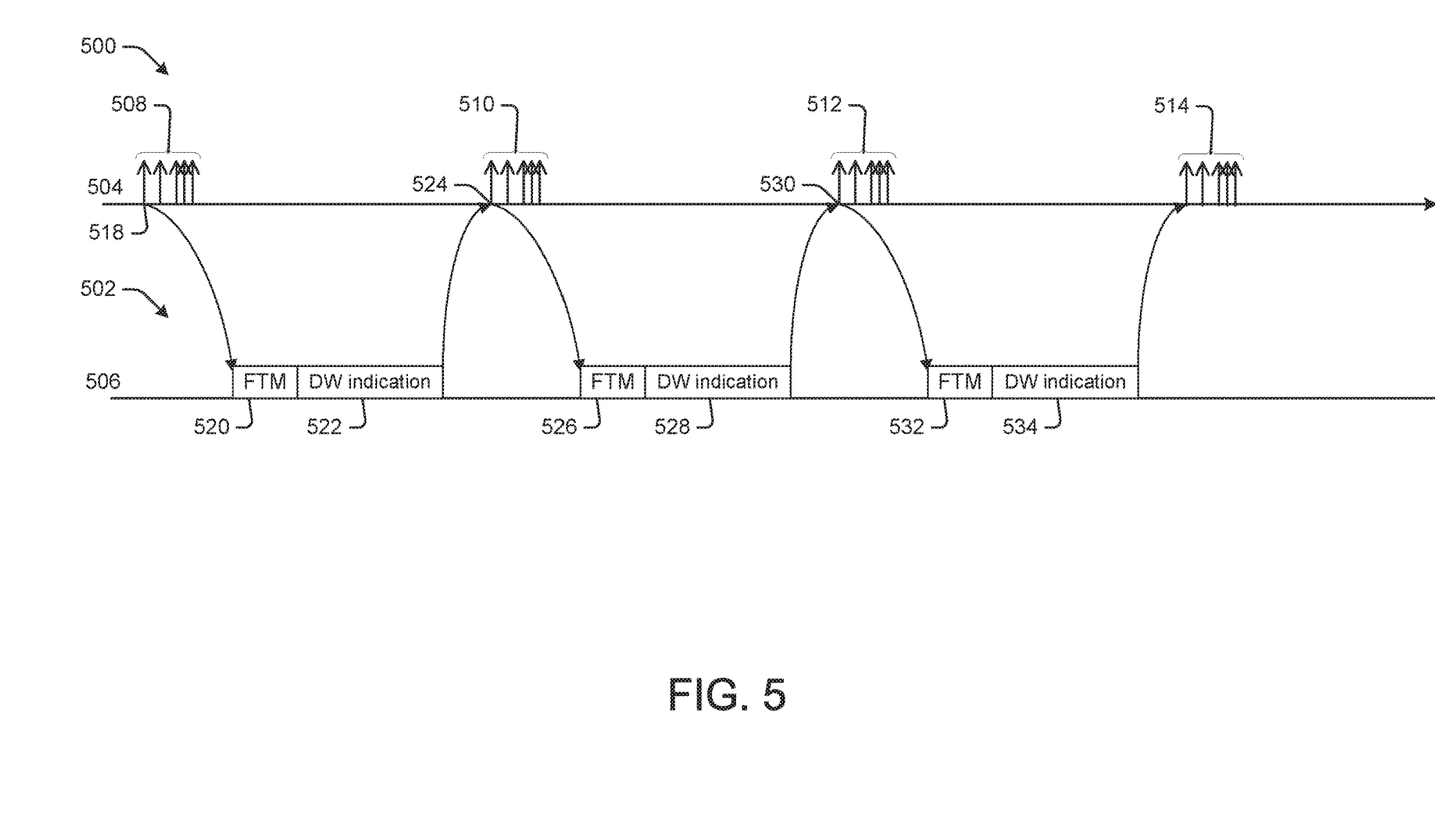
FIGS. 5-7 are schematic diagrams depicting different dynamic pre-associations between Neighbor Awareness Networking (NAN) discovery windows and FTM communications according to example embodiments of the present disclosure.
Figure 6:
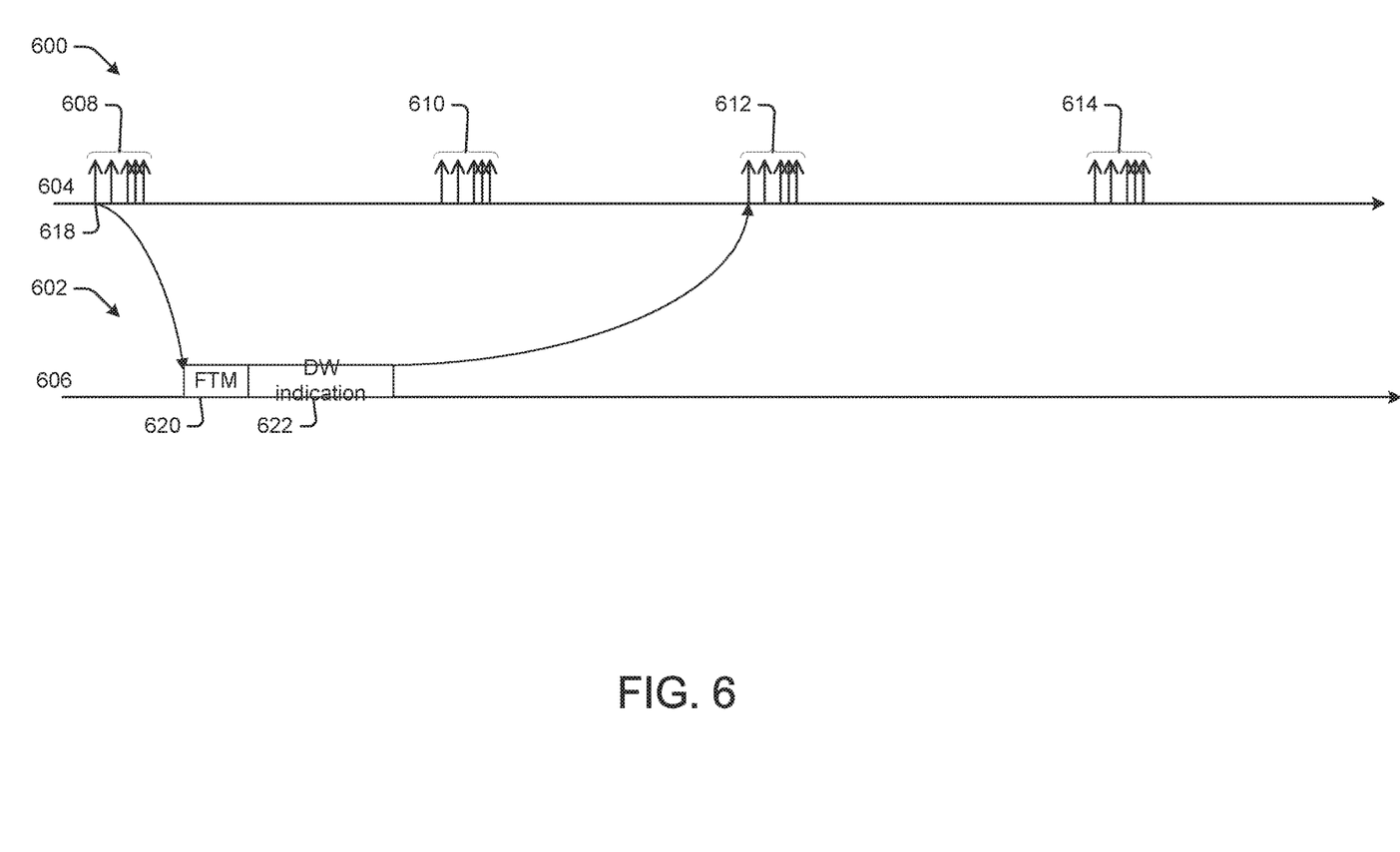
Figure 7:
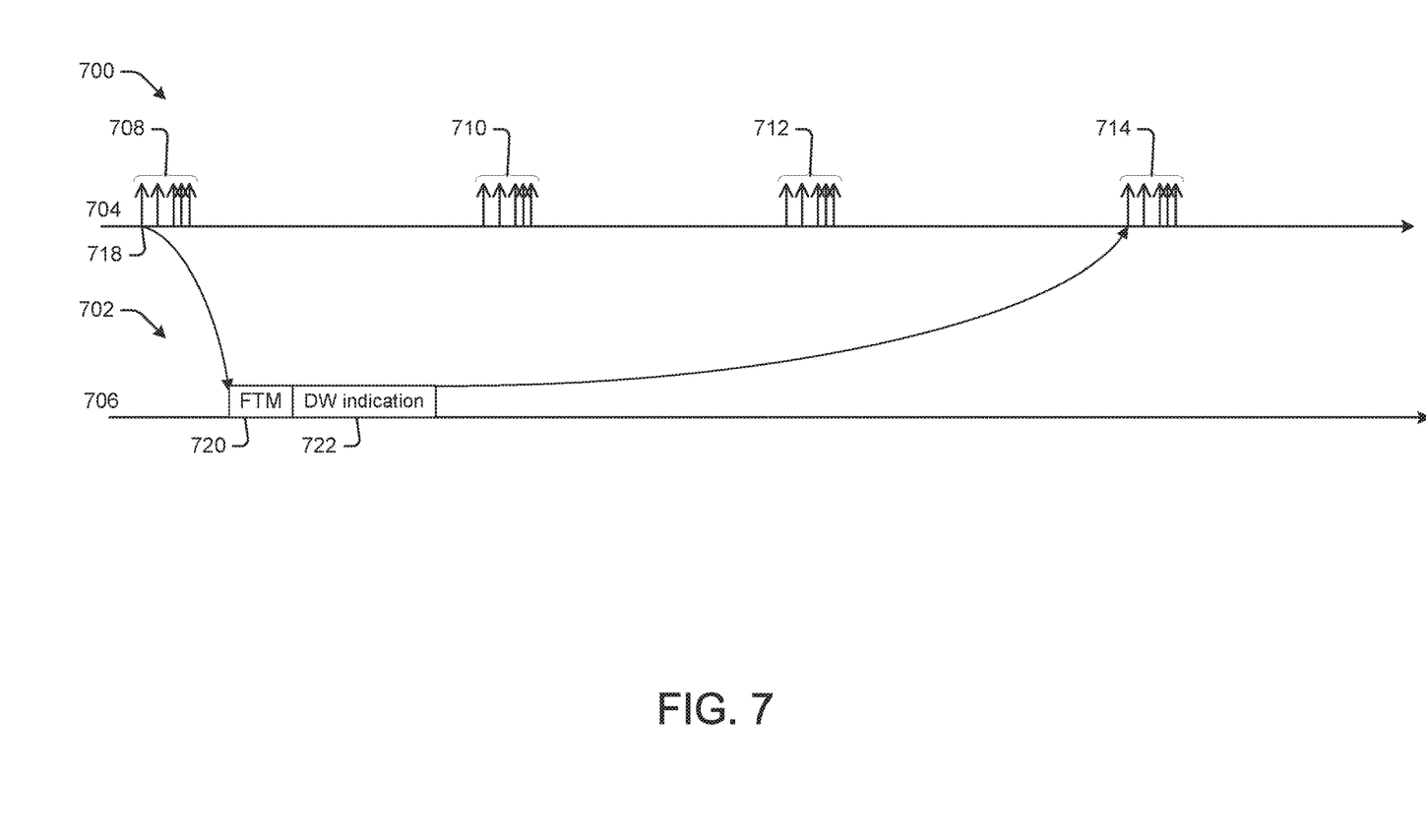

FIGS. 5-7 are three schematic diagrams illustrating different dynamic pre-associations between NAN discovery windows and FTM communications in accordance with the techniques described herein. As described below, FIGS. 5-7 depict pre-associations in order of decreasing range measurement rates and power consumption. Similar to the figures described above, FIG. 5 depicts NAN discovery communications 500 on a first channel 504 and FTM communications 506 on a second channel 508 in accordance with the techniques described herein. The NAN discovery communications 500 include discovery windows 508, 510, 512, and 514, which may occur according to a fixed period and may be separated by discovery window intervals (not shown).

As shown in FIG. 5, a NAN SDF 518 may be sent during the first discovery window 510 to trigger an FTM procedure on the second channel 506, resulting in an FTM communication 520. In accordance with the techniques described above, an indication 522 of a discovery window for an expected subsequent FTM communication is also sent. In the embodiment depicted in FIG. 5, the next available discovery window 510 is indicated. For example, a NAN SDF 524 may be sent during the discovery window 510 to trigger a subsequent FTM procedure. Here again, an FTM communication 526 and an indication 528 of a discovery window may be sent. To maintain a higher rate of range measurements, the indication 528 may indicate the next available discovery window 512. As also illustrated in FIG. 5, another NAN SDF 530 may be sent during the indicated discovery window 512 to trigger yet another FTM procedure. The next FTM communication 532 and discovery window indication 534 sent are also shown in FIG. 5. Accordingly, in the embodiment depicted in FIG. 5, the wireless station sending the communication may desire more frequent FTM procedures and thus a higher rate of FTM range determinations to ensure a level of responsiveness for an application. However, as will be appreciated, more frequent FTM communications may result in increased power consumption, such as compared to the pre-associations depicted in FIGS. 6 and 7.

FIG. 6 depicts another dynamic pre-association between NAN discovery communications 600 on a first channel 604 and FTM communications 606 on a second channel 608 having a lower rate of range measurements and decreased power consumption as compared to the pre-association depicted in FIG. 5. As shown in FIG. 6, the NAN discovery communications 600 include discovery windows 608, 610, 612, and 614, which may occur according to a fixed period and may be separated by discovery window intervals (not shown).

As depicted in FIG. 6, a NAN SDF 618 may be sent during the first discovery window 610 to trigger an FTM procedure on the second channel 606. According to the techniques described above, an FTM communication 620 and an indication 622 of a discovery window 612 for an expected subsequent FTM communication is also sent. In the embodiment depicted in FIG. 6, the third discovery window 612 is indicated as opposed to the next available discovery window 610. Thus, by indicating a later discovery window 612 instead of discovery window 610, the wireless station may not desire an FTM range determination until occurrence of the later discovery window 612. In such an embodiment, although updates to the FTM range determinations may occur at a lower rate than those occurring in FIG. 5, the power consumption by the wireless station may be decreased due to the less frequent FTM communications.

FIG. 7 another dynamic pre-association between NAN discovery communications 700 on a first channel 704 and FTM communications 702 on a second channel 706 having a lower rate of range measurements and decreased power consumption as compared to the pre-association depicted in FIG. 6. As shown in FIG. 7, the NAN discovery communications 700 include discovery windows 708, 710, 712, and 714, which may occur according to a fixed period and may be separated by a discovery window interval (not shown).

As shown in FIG. 7 and similar to the embodiments described above, a NAN SDF 718 may be sent in the first discovery window 710 to trigger an FTM procedure on the second channel 708. In accordance with the techniques described above, an FTM communication 720 and an indication 722 of the next discovery window for an expected subsequent FTM communication is also sent. In the embodiment depicted in FIG. 7, the fourth discovery window 714 depicted in FIG. 7 is indicated, as opposed to earlier occurring discovery windows 710 and 712. Thus, by indicating a later discovery window 714 instead of earlier discovery windows 710 and 712, a wireless station may not desire an FTM range determination until occurrence of the later discovery window 714. Accordingly, the wireless station may reduce power consumption by reducing the rate of FTM procedures and corresponding FTM range determinations until occurrence of the later discovery window 714. In such embodiments, a wireless station may continue to indicate every fourth discovery window to maintain desired FTM range measurement rates and power consumption. In such an embodiment, although the rate of FTM range determinations may be lower than those occurring in the pre-associations depicted in FIGS. 5 and 6, such a configuration may be desirable with respect to the distance between wireless stations, application responsiveness and accuracy requirements, and other factors.

In some embodiments, a mobile wireless station (e.g., smartphone 102B) may switch between any number of NAN discovery window and FTM pre-associations. For example, a wireless station further than a distance threshold from a fixed wireless station (e.g., wireless station 102D) may use the NAN discovery window and FTM communications association depicted in FIG. 7. Once the mobile wireless station is at or within the distance threshold from the fixed wireless station, the mobile wireless station may switch to a higher rate of FTM range measurements by associating FTM communications with more frequent discovery windows, such as by using to the NAN discovery window and FTM communications association depicted in FIG. 5. If the mobile wireless station moves away from the stationary station and is farther than the distance threshold from the fixed wireless station, the mobile wireless station may switch to a NAN discovery window and FTM communications association having a lower rate of FTM range measurement determinations.

Figure 8:
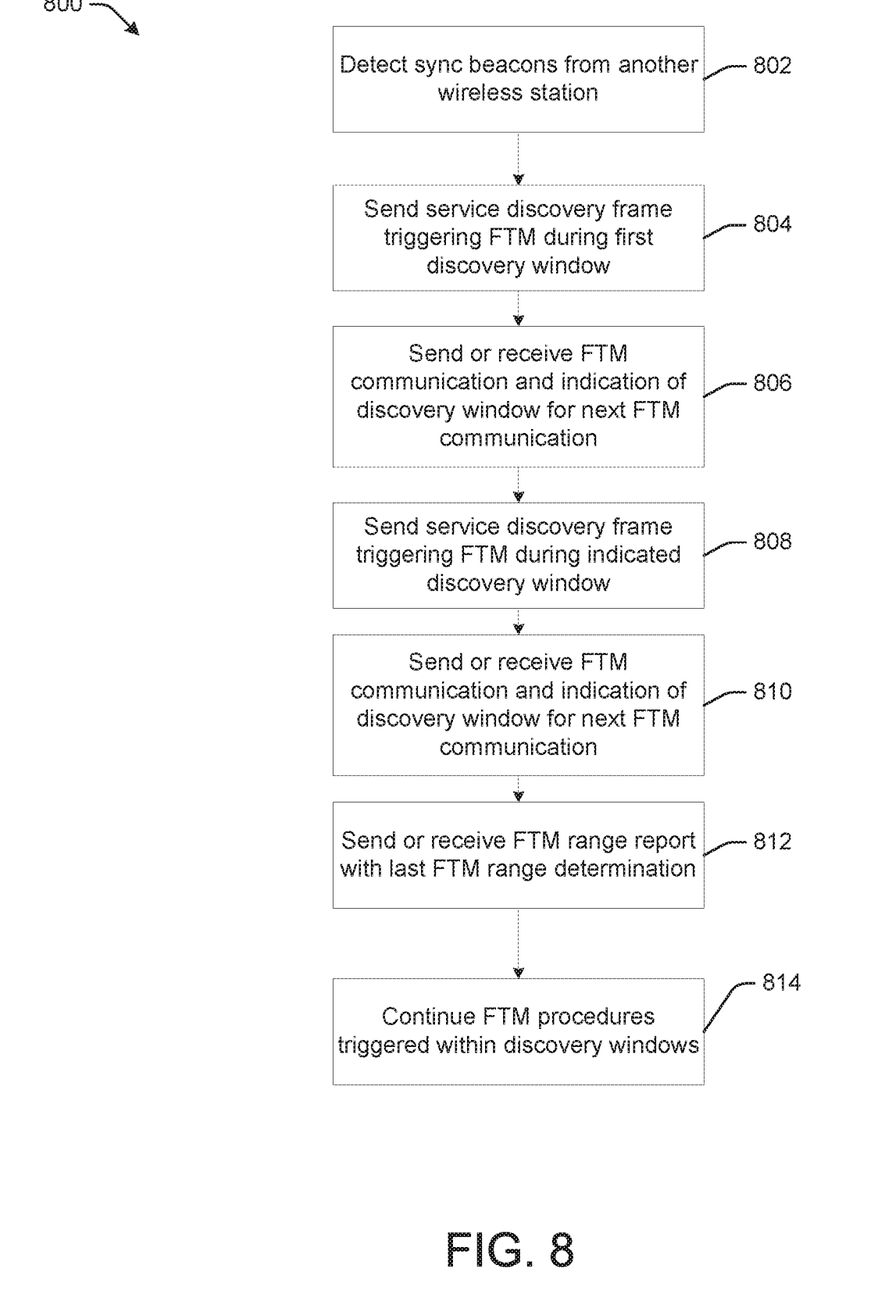
FIG. 8 is a block diagram illustrating a process for a dynamic pre-association between Neighbor Awareness Networking (NAN) discovery windows and FTM communications according to example embodiments of the present disclosure.

FIG. 8 depicts a process 800 for associating a NAN discovery window and an FTM procedure in accordance with the techniques described herein. The process 800 may be performed by an initiating wireless station or a responding wireless station. As shown in FIG. 8, discovery beacons from another wireless station in a NAN cluster may be detected (block 802). A NAN SDF may be sent during a first discovery window to trigger an FTM procedure with the other wireless station (block 804). An FTM communication and an indication of a discovery window for the next expected FTM communication may then be sent or received (block 806). Next, another NAN SDF to initiate FTM communications is sent during the indicated discovery window (block 808). Another FTM communication and an indication of the discovery window for the next FTM communication is sent or received (block 810). Additionally, as described above and as illustrated in FIG. 4, in some embodiments an FTM range report based on a previous FTM range measurement determination may be sent or received (block 812). The process 800 may continue to trigger FTM procedures within NAN discovery windows (block 814) until the process is terminated, such as when FTM range measurements are no longer obtained, a mobile wireless station moves out of a NAN cluster, a wireless station is powered off, and so on.

Figure 9:
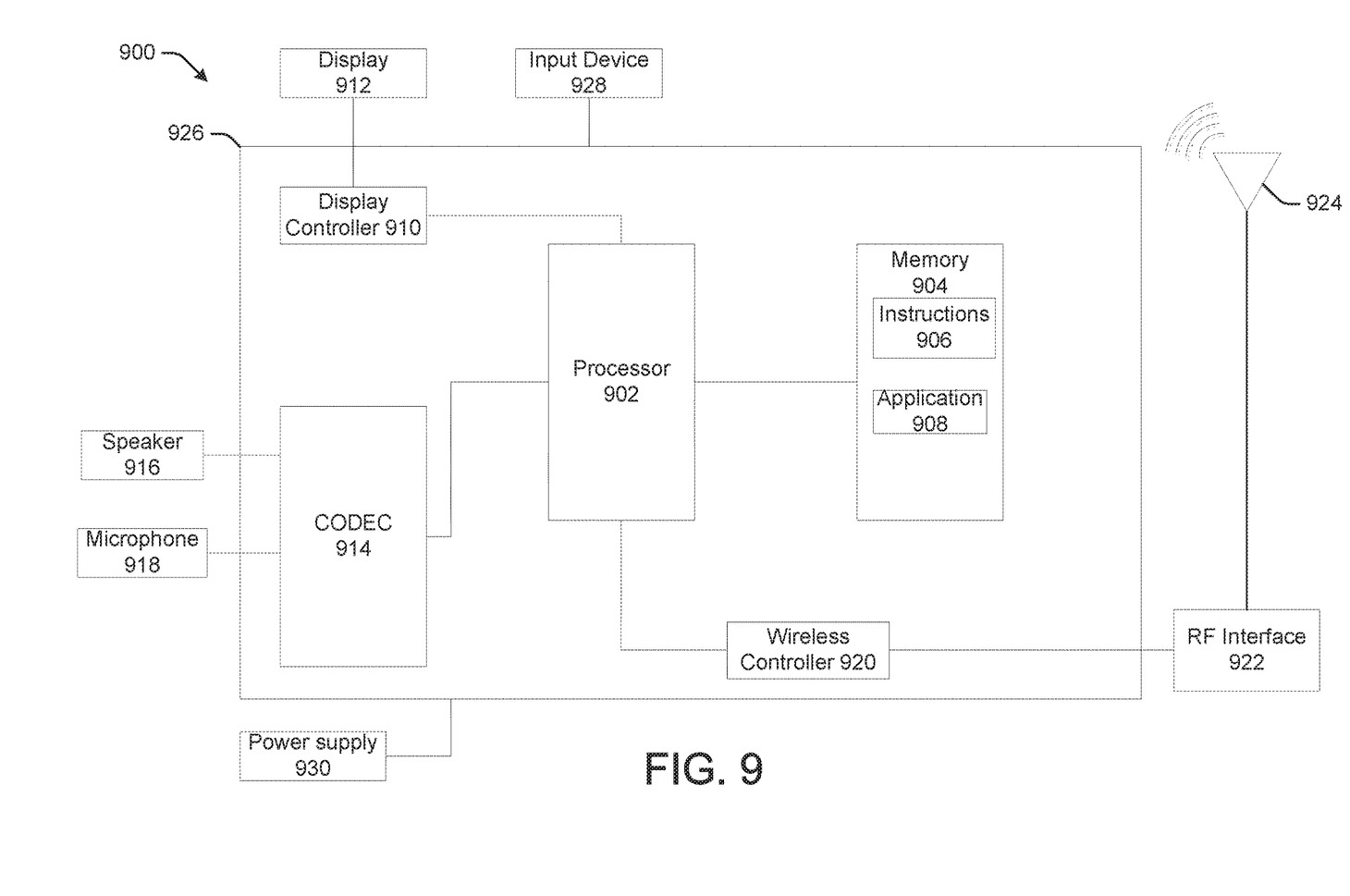
FIG. 9 depicts a block diagram of an example embodiment of a wireless station according to example embodiments of the present disclosure.

FIG. 9 depicts a block diagram of an example embodiment of a wireless station 900, such as any of the wireless stations 102 of FIG. 1 or otherwise referred to herein. The mobile device 900 includes a processor 902 and a non-transitory computer-readable medium (e.g., a memory 904) coupled to the processor. The memory 904 may include instructions 906 executable by the processor 902.

The processor 902 may be further configured to or may execute the instructions 906 to communicate according to a post discovery technique (e.g., a Wi-Fi direct technique) using credentials (e.g., a passphrase, encryption/decryption keys, or a combination thereof) obtained via a paging message (e.g., a paging request, a paging response, or a combination thereof). For example, in a particular embodiment, the processor 902 executes the instructions 906 perform one or more operations described in reference to the process 800 of FIG. 8, for example.

The processor 902 may further be configured to or may execute the instructions 906 to determine a post-discovery communication protocol for communicating within a NAN cluster (e.g., NAN cluster 104) after a discovery interval and to send, during the discovery interval, a discovery message indicating the post-discovery communication technique for communicating within the cluster after the discovery interval.

The processor 902 may be configured to or may execute the instructions 906 to receive, during a discovery interval, a discovery message from a second wireless station (e.g., another of the wireless stations 102). The discovery message indicates a post-discovery communication protocol for communicating within a NAN cluster (e.g., the NAN cluster 104) after the discovery interval. The processor 902 may be further configured to or may execute the instructions 906 to send a response to the second wireless station using the post-discovery communication protocol.

The memory 904 may store additional instructions, data, or a combination thereof. For example, the memory 904 may store an application 908. In a particular illustrative embodiment, the application 908 may be a common application shared or run by each device of a mobile device cluster, such as the NAN cluster 104. The application 908 may be a mobile device social networking application, a mobile device gaming application, or a combination thereof. The memory 904 may store information related to the dynamic pre-association between NAN discovery windows and FTM communications described herein. For example, the memory 904 may store various configurations for different pre-associations between NAN discovery windows and FTM communications that may enable switching between configurations based a desired the responsiveness and power consumption, as described above. In some embodiments, the memory 904 may store a default configuration defining a pre-association between NAN discovery windows and FTM communications.

FIG. 9 also shows a display controller 910 that is coupled to the processor 902 and to a display 912. A coder/decoder (CODEC) 914 can also be coupled to the processor 902. A speaker 916 and a microphone 918 can be coupled to the CODEC 914. FIG. 9 also indicates that a wireless controller 920 can be coupled to the processor 902, to a radio frequency (RF) interface 922 (e.g., a transceiver), and to a wireless antenna 924.

In a particular embodiment, the processor 902, the display controller 910, the memory 904, the CODEC 914, and the wireless controller 920 are included in a system-in-package or system-on-chip device 926. In a particular embodiment, an input device 928 and a power supply 930 are coupled to the system-on-chip device 926. Moreover, in a particular embodiment, as illustrated in FIG. 9, the display 912, the input device 928, the speaker 916, the microphone 918, the RF interface 922, the wireless antenna 924, and the power supply 930 are external to the system-on-chip device 926. However, each of the display 912, the input device 928, the speaker 916, the microphone 918, the RF interface 922, the wireless antenna 924, and the power supply 930 can be coupled to a component of the system-on-chip device 926, such as an interface or a controller.

In addition, various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a process or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary non-transitory (e.g., tangible) storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The processor executable instructions may further be transmitted or received over a communications network using a transmission medium via the network interface device/transceiver utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver may include one or more physical jacks (e.g., Ethernet, coaxial, or phone jacks) or one or more antennas to connect to the communications network. In an example, the network interface device/transceiver may include a plurality of antennas to communicate wirelessly using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine, and includes digital or analog communications signals or other intangible media to facilitate communication of such software.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the disclosure. It is to be understood that the forms of the disclosure shown and described herein are to be taken as examples of embodiments. Elements and materials may be substituted for those illustrated and described herein, parts and processes may be reversed or omitted, and certain features of the disclosure may be utilized independently, all as would be apparent to one skilled in the art after having the benefit of this description of the disclosure. Changes may be made in the elements described herein without departing from the spirit and scope of the disclosure as described in the following claims. Headings used herein are for organizational purposes only and are not meant to be used to limit the scope of the description.

Further Embodiments

In a first example embodiment, there is disclosed a method for communication between two wireless devices including identifying, by a first wireless device, a second wireless device in a Neighbor Awareness Networking (NAN) cluster available for a fine timing measurement (FTM) range determination and transmitting, by the first wireless device, a NAN service discovery frame (SDF) during a first NAN discovery window to trigger a first FTM communication with the second wireless device. The method also includes transmitting, by the first wireless device, an indication of a second NAN discovery window for an expected second FTM communication with the second wireless device.

In some embodiments, the NAN SDF may be transmitted on a first channel and the indication of the second NAN discovery window is transmitted on a second channel. In additional or alternative embodiments, the method includes transmitting, by the first wireless device, the first FTM communication to the second wireless device, and the NAN SDF may be transmitted on a first channel and the first FTM communication is transmitted on a second channel. In some embodiments, the method includes transmitting, by the first wireless device, a second FTM communication during the second NAN discovery window. In additional or alternative embodiments, the indication of the second NAN discovery window includes a time, a time interval, an indication of an SDF, or a combination thereof. In additional or alternative embodiments, first wireless device includes a tablet computer or smartphone.

In a second example embodiment, there is disclosed a tangible non-transitory machine-readable medium storing computer-executable instructions that, when executed by a processor, configure the processor to perform operations that include identifying, by a first wireless device, a second wireless device in a Neighbor Awareness Networking (NAN) cluster available for a fine timing measurement (FTM) range determination and transmitting, by the first wireless device, a service discovery frame (SDF) during a first NAN discovery window to trigger a first FTM communication with second wireless device. The computer readable medium includes further computer-executable instructions that, when executed by the at least one processor, configure the processor to perform operations that include transmitting, by the first wireless device, an indication of a second NAN discovery window for an expected second FTM communication with the second wireless device.

In some embodiments, the NAN SDF may be transmitted on a first channel and the indication of the second NAN discovery window is transmitted on a second channel. In additional or alternative embodiments, the computer readable medium includes further computer-executable instructions that, when executed by the at least one processor, configure the processor to perform operations that include transmitting, by the first wireless device, the first FTM communication to the second wireless device, and the NAN SDF may be transmitted on a first channel and the first FTM communication is transmitted on a second channel. In some embodiments, the computer readable medium includes further computer-executable instructions that, when executed by the at least one processor, configure the processor to perform operations that include transmitting, by the first wireless device, a second FTM communication during the second NAN discovery window. In additional or alternative embodiments, the indication of the second NAN discovery window includes a time, a time interval, an indication of an SDF, or a combination thereof.

In a third example embodiment, there is disclosed a wireless device having a memory including computer instructions stored thereon and a processor configured to access the memory and executed the computer instruction to perform operations that include identifying another wireless device in a Neighbor Awareness Networking (NAN) cluster available for a fine timing measurement (FTM) range determination and transmitting a service discovery frame (SDF) during a first NAN discovery window to trigger a first FTM communication with the other wireless device. The processor is further configured to access the memory and execute the computer instructions to perform operations that include transmitting, by the wireless device, an indication of a second NAN discovery window for an expected second FTM communication with the other wireless device.

In some embodiments, the NAN SDF is transmitted on a first channel and the indication of second NAN discovery window is transmitted on a second channel. In additional or alternative embodiments, the processor is further configured to access the memory and execute the computer instructions to perform operations that include transmitting, by the first wireless device, the first FTM communication to the second wireless device, and the NAN SDF is transmitted on a first channel and the first FTM communication is transmitted on a second channel. In additional or alternative embodiments, the indication of a second NAN discovery window comprises a time, a time interval, an indication of an SDF, or a combination thereof.

In a fourth example embodiment, there is disclosed a method for communication between two wireless devices that includes identifying, by a first wireless device, a second wireless device in a Neighbor Awareness Networking (NAN) cluster available for a fine timing measurement (FTM) range determination and using, by the first wireless device, a first pre-association between a first plurality of NAN discovery windows and a respectively first plurality of FTM communications to obtain a first one or more FTM range measurements, wherein the first pre-association includes a first one or more indications sent from the first wireless device and corresponding to one or more of the first plurality of NAN discovery windows. The method also includes using, by the first wireless device, a second pre-association between a second plurality of NAN discovery windows and a respective second plurality of FTM communications to obtain a second one or more FTM range measurements, wherein the second pre-association includes a second one or more indications sent from the first wireless device and corresponding to one or more of the second plurality of NAN discovery windows.

In some embodiments, the method includes transmitting, by the first wireless device, one or more of the first plurality of FTM communications to the second wireless device. In additional or alternative embodiments, the first one or more indications comprise a time, a time interval, an indication of a service discovery frame (SDF), or a combination thereof. In additional or alterative embodiments, the second one or more indications comprise a time, a time interval, an indication of a service discovery frame (SDF), or a combination thereof. In additional or alternative embodiments, the first wireless device comprises a tablet computer or smartphone. In additional or alternative embodiments, the first one or more indications and the first plurality of FTM communications are transmitted on the same channel. In additional or alternative embodiments, identifying, by a first wireless device, a second wireless device in a Neighbor Awareness Networking (NAN) cluster available for a fine timing measurement (FTM) range determination includes detecting a beacon sent from the second wireless device.

In a fifth example embodiment, there is disclosed a tangible non-transitory machine-readable medium storing computer-executable instructions that, when executed by a processor, configure the processor to perform operations that include identifying, by a first wireless device, a second wireless device in a Neighbor Awareness Networking (NAN) cluster available for a fine timing measurement (FTM) range determination and using, by the first wireless device, a first pre-association between a first plurality of NAN discovery windows and a respectively first plurality of FTM communications to obtain a first one or more FTM range measurements, wherein the first pre-association includes a first one or more indications sent from the first wireless device and corresponding to one or more of the first plurality of NAN discovery windows. The computer readable medium includes further computer-executable instructions that, when executed by the at least one processor, configure the processor to perform operations that include using, by the first wireless device, a second pre-association between a second plurality of NAN discovery windows and a respective second plurality of FTM communications to obtain a second one or more FTM range measurements, wherein the second pre-association includes a second one or more indications sent from the first wireless device and corresponding to one or more of the second plurality of NAN discovery windows.

In some embodiments, the computer readable medium further includes computer-executable instructions that, when executed by the at least one processor, configure the processor to perform operations that include transmitting, by the first wireless device, one or more of the first plurality of FTM communications to the second wireless device. In additional or alternative embodiments, the first one or more indications comprise a time, a time interval, an indication of a service discovery frame (SDF), or a combination thereof. In additional or alterative embodiments, the second one or more indications comprise a time, a time interval, an indication of a service discovery frame (SDF), or a combination thereof. In additional or alternative embodiments, the first wireless device comprises a tablet computer or smartphone. In additional or alternative embodiments, the first one or more indications and the first plurality of FTM communications are transmitted on the same channel. In additional or alternative embodiments, identifying, by a first wireless device, a second wireless device in a Neighbor Awareness Networking (NAN) cluster available for a fine timing measurement (FTM) range determination includes detecting a beacon sent from the second wireless device.

In a sixth example embodiment, a wireless device is provided that includes means for identifying another wireless device in a Neighbor Awareness Networking (NAN) cluster available for a fine timing measurement (FTM) range determination and means for transmitting a service discovery frame (SDF) during a first NAN discovery window to trigger a first FTM communication with the other wireless device. The wireless device further includes means for transmitting an indication of a second NAN discovery window for an expected second FTM communication with the other wireless device.

In some embodiments, the NAN SDF is transmitted on a first channel and the indication of second NAN discovery window is transmitted on a second channel. In additional or alternative embodiments, the wireless device includes means for transmitting, by the first wireless device, the first FTM communication to the second wireless device. In additional or alternative embodiments, the NAN SDF is transmitted on a first channel and the first FTM communication is transmitted on a second channel. In additional or alternative embodiments, the indication of a second NAN discovery window comprises a time, a time interval, an indication of an SDF, or a combination thereof. In additional or alternative embodiments, the indication of a second NAN discovery window comprises a time, a time interval, an indication of an SDF, or a combination thereof. In additional or alternative embodiments, the wireless device includes a transceiver coupled to the processor and is configured to transmit the SDF over at least one radio frequency (RF). In additional or alternative embodiments, the wireless device includes an antenna coupled to the transceiver. In additional or alternative embodiments, the wireless device includes a display coupled to the processor.

In a seventh example embodiment, there is disclosed a wireless device that includes means for identifying, from a first wireless device, a second wireless device in a Neighbor Awareness Networking (NAN) cluster available for a fine timing measurement (FTM) range determination and means for using a first pre-association between a first plurality of NAN discovery windows and a respectively first plurality of FTM communications to obtain a first one or more FTM range measurements, wherein the first pre-association includes a first one or more indications sent from the first wireless device and corresponding to one or more of the first plurality of NAN discovery windows. The wireless device also includes means for using a second pre-association between a second plurality of NAN discovery windows and a respective second plurality of FTM communications to obtain a second one or more FTM range measurements, wherein the second pre-association includes a second one or more indications sent from the first wireless device and corresponding to one or more of the second plurality of NAN discovery windows.

The invention claimed is:

1. A neighbor awareness networking (NAN) device for performing a fine timing measurement (FTM) with a peer device, the NAN device comprising memory and processing circuitry configured to:
cause to send a first NAN service discovery frame to the peer device, the first NAN service discovery frame comprising an indication of a first window associated with the NAN device;
receive, from the peer device, a second NAN service discovery frame comprising an indication of a second window associated with the peer device;
cause to send an FTM request to the peer device during the second window, wherein the FTM request comprises an indication of a third window;
receive, from the peer device, during the third window, an FTM frame; and
cause to send an FTM range report to the peer device, the FTM range report comprising an indication of a range based on the FTM frame.

2. The NAN device of claim 1, wherein the FTM request is a first FTM request, and wherein the memory and processing circuitry are further configured to:
receive, from the peer device, an FTM response comprising an indication of a fourth window associated with the peer device; and
cause to send, to the peer device, during the fourth window, a second FTM request.

3. The NAN device of claim 1, wherein the FTM request is a first FTM request, and wherein the memory and processing circuitry are further configured to receive, from the peer device, during the third window, a second FTM request.

4. The NAN device of claim 1, wherein the FTM request indicates a request for a single burst session.

5. The NAN device of claim 1, wherein the memory and processing circuitry are further configured to determine the range, wherein the range indicates a distance between the NAN device and the peer device.

6. The NAN device of claim 1, wherein the first NAN service discovery frame comprises an indication of a channel.

7. The NAN device of claim 1, further comprising a transceiver configured to transmit and receive wireless signals, the one or more wireless signals comprising at least one of the first NAN service discovery frame, the second NAN service discovery frame, the FTM request, the FTM frame, or the FTM range report.

8. The NAN device of claim 7, further comprising one or more antennas coupled to the transceiver.

9. A non-transitory computer-readable medium storing computer-executable instructions which when executed by one or more processors result in performing operations comprising:
receiving, at a first device from a second device, a first neighbor awareness networking (NAN) service discovery frame comprising an indication of a first window associated with the second device;
causing to send, to the second device, a second NAN service discovery frame comprising an indication of a second window associated with the first device;
receiving, at the first device from the second device, a fine timing measurement (FTM) request during the second window, the FTM request comprising an indication of a third window associated with the second device; and
causing to send, to the second device during the third window, an FTM frame.

10. The non-transitory computer-readable medium of claim 9, wherein the FTM request is a first FTM request, and wherein the operations further comprise causing to send, to the second device during the third window, a second FTM request.

11. The non-transitory computer-readable medium of claim 9, wherein the FTM request is a first FTM request, and wherein the operations further comprise:
causing to send, to the second device, a FTM response comprising an indication of a fourth window associated with the first device; and
receiving, from the second device during the fourth window, a second FTM request.

12. The non-transitory computer-readable medium of claim 9, wherein the FTM request indicates a request for a single burst session.

13. The non-transitory computer-readable medium of claim 9, wherein the operations further comprise receiving, from the second device, an FTM range report comprising an indication of a range determination based on the FTM frame.

14. The non-transitory computer-readable medium of claim 9, wherein the NAN service discovery frame comprises an indication of a channel.

15. A method for performing a fine timing measurement (FTM) with a peer device, the method comprising:
causing to send, by one or more processors of a neighbor awareness networking (NAN) device, to the peer device, a first NAN service discovery frame comprising an indication of a first window associated with the NAN device;

receiving, by the one or more processors, from the peer device, a second NAN service discovery frame comprising an indication of a second window associated with the peer device;

causing to send, by the one or more processors, an FTM request to the peer device during the second window, wherein the FTM request comprises an indication of a third window;

receiving, by the one or more processors, from the peer device, during the third window, an FTM frame; and causing to send, by the one or more processors, an FTM range report to the peer device, the FTM range report comprising an indication of a range based on the FTM frame.

16. The method of claim 15, wherein the FTM request is a first FTM request, the method further comprising:

receiving, from the peer device, an FTM response comprising an indication of a fourth window associated with the peer device; and causing to send, to the peer device, during the fourth window, a second FTM request.

17. The method of claim 15, wherein the FTM request is a first FTM request, the method further comprising receiving, from the peer device during the third window, a second FTM request.

18. The method of claim 15, wherein the FTM request indicates a request for a single burst session.

19. The method of claim 15, further comprising determining the range, wherein the range indicates a distance between the NAN device and the peer device.

20. The method of claim 15, wherein the first NAN service discovery frame comprises an indication of a channel.

* * * * *